United States Patent [19]

Hoshino et al.

[11] 4,061,211
[45] Dec. 6, 1977

[54] INTERNAL SHOE DRUM BRAKE

[75] Inventors: Kazuo Hoshino, Sayama; Masakazu Tanbara, Higashi-Kurume, both of Japan

[73] Assignee: Nissan Motor Co., Ltd., Japan

[21] Appl. No.: 772,092

[22] Filed: Feb. 25, 1977

[30] Foreign Application Priority Data

Jan. 3, 1976   Japan .................................. 51-21072

[51] Int. Cl.² .............................................. F16D 65/56
[52] U.S. Cl. ............................ 188/79.5 P; 188/196 F
[58] Field of Search ................... 188/79.5 P, 79.5 B, 188/196 BA, 196 F, 216

[56] References Cited
U.S. PATENT DOCUMENTS

| | | | |
|---|---|---|---|
| 3,621,947 | 11/1971 | Margetts | 188/79.5 P |
| 3,719,258 | 3/1973 | Margetts | 188/79.5 P |
| 3,794,145 | 2/1974 | Margetts | 188/79.5 P |

Primary Examiner—Duane A. Reger
Attorney, Agent, or Firm—Lane, Aitken, Dunner & Ziems

[57] ABSTRACT

An internal shoe drum brake comprises a pair of brake shoes, return spring means, service brake means, manually actuated auxiliary brake means including an actuating lever with a finger and an adjustable, in length, strut. The strut includes relatively rotatable screw threaded parts, i.e., a screw-threaded spindle slidably received in a tube member, a ratchet wheel in threaded engagement with the spindle and stopper held in yielding contact with the wheel, so that the strut is adjustable in length to adjust shoe clearances, a pivoted adjusting lever with a pawl tooth for effecting rotation of the ratchet wheel relative to the spindle upon brake application by the auxiliary brake means, and a prestressed coil torsion spring arranged to transmit forces to urge the adjusting lever in a direction to effect shoe clearance adjustment as required in response to operation of the auxiliary brake means.

3 Claims, 4 Drawing Figures

INTERNAL SHOE DRUM BRAKE

BACKGROUND OF THE INVENTION

The present invention relates to internal shoe drum brakes with a slack adjuster.

The invention is particularly concerned with internal shoe drum brakes of the class having a pair of expansible brake shoes, shoe return spring means for retracting the shoes, power actuated service brake means for expanding the shoes, manually actuated auxiliary brake means for expanding the shoes, a strut of adjustable length which transmits manually applied loads between the shoes, the service brake means being operable to relieve the strut of load, the strut comprising a pair of relatively rotatable members screw threaded together, and a pivoted adjusting lever for effecting relative rotation of the strut members to lengthen the strut upon brake application by the auxiliary brake means.

In brakes of this class, it is known to arrange for the adjusting lever to be driven through the intermediary of a torsion spring.

There are two procedures for adjusting shoe clearances, one being that the auxiliary brake means is actuated to apply brake without any relief of load on the strut by operation of the service brake means, the other being that after the load on the strut is relieved upon brake application by the service brake means the auxiliary brake means is actuated to apply brake.

With the former procedure, it is easy to adjust shoe clearances because such adjustment is effected by the auxiliary brake means only. Therefore, this procedure lends itself to adjustment of relatively large shoe clearances. However, a large manual force is required upon brake application by the auxiliary brake means to overcome a rolling resistance opposing relative rotation of one of the strut members, in the form of the ratchet wheel, to the other and a load on the strut by shoe return spring means.

With the latter procedure, it is not easy to adjust relatively large shoe clearances because the service brake means must be operated before shoe clearance adjustment is effected by the auxiliary brake means. However, this prodecure lends itself to adjustment of relatively small shoe clearances upon automatic wear compensation because with a small force the auxiliary brake means can be actuated.

SUMMARY OF THE INVENTION

It is therefore an object of the present invention to provide an internal shoe drum brake of the class described above having an arrangement whereby when adjustment of relatively large shoe clearances is required, it may be effected by actuating auxiliary brake means only, while, when adjustment of relatively small shoe clearances is required for shoe lining wear compensation, it may be effected by actuating the auxiliary brake means upon brake application by service brake means.

The invention is embodied in a conventional internal shoe drum brake of the class, described above, that is designed so as to effect shoe clearnace adjustment upon brake application by auxiliary brake means during brake application by service brake means.

According to the present invention, a spring force of shoe return spring means, i.e., a load imposed axially on a strut of adjustable length, and a resistance opposing relative rotation of a ratchet wheel portion of the strut to a threaded spindle portion thereof are selected such as to enable adjustment of relatively large shoe clearances, which is necessary on assembly, to be effected upon brake application by the auxiliary brake means only.

More specifically, the spring force of the shoe return spring means should be lower than such a high value, i.e., an upper limit, that if the spring force is higher than this value, a resistance opposing "adjust rotation" of the ratchet wheel of the strut, which increases with an increase of the spring force, becomes too high to allow the "adjust rotation" of the ratchet wheel upon brake application by the auxiliary brake means only, but it should be higher than such a low value, i.e., a lower limit, that if the spring force is lower than this value, a resistance opposing "reverse rotation" of the ratchet wheel becomes too low to prevent the "reverse rotation" of the ratchet wheel by a pawl on the adjusting lever upon brake release by the auxiliary brake means. With the shoe return spring means yielding a spring force falling within the range defined by the upper and lower limits, actuating the auxiliary brake means only would effect adjustment of relatively large shoe clearances which is necessary on assemblying the component parts of the brake, whereas, compensating adjustment would be effected by the auxiliary brake means upon brake application by the service brake means.

The range as above has been selected after consideration of an effect of the spring force of the return spring means on shoe clearance adjustment operation, that is:

Although, on assembling the shoe return spring means and the shoes, length of the spring means is short, retracting the shoes with a little force and imposing a little load on the strut, the load imposed on the strut will increase as the length of the spring means increases when the shoes are expanded towards the drum upon adjustment of shoe clearances. The spring force after such adjustment is large (usually amounts to approximately 1kg/mm). Resistance opposing "adjust rotation" of the ratchet wheel of the strut increases as the return spring means is lengthened. Therefore, when the designed spring force is large, a pawl on the adjusting lever will ride over a tooth on the ratchet wheel upon brake application by the auxiliary brake means only for shoe clearance adjustment, although "reverse rotation" of the ratchet wheel by the pawl will be prevented.

BRIEF DESCRIPTION OF THE DRAWINGS

The invention will be further described hereinafter with reference to the accompanying drawings, in which.

DESCRIPTION OF THE INVENTION

Figure 1:
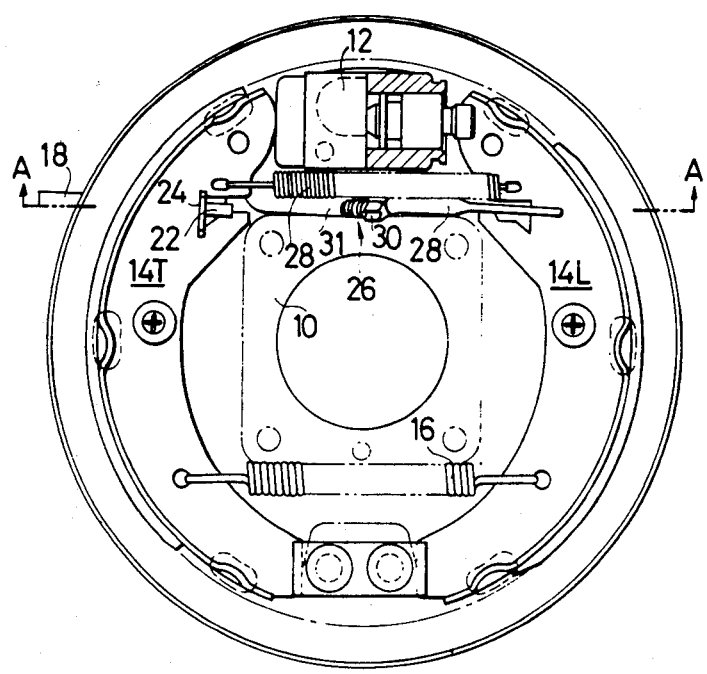
FIG. 1 is a side elevation of the brake.
Figure 2:
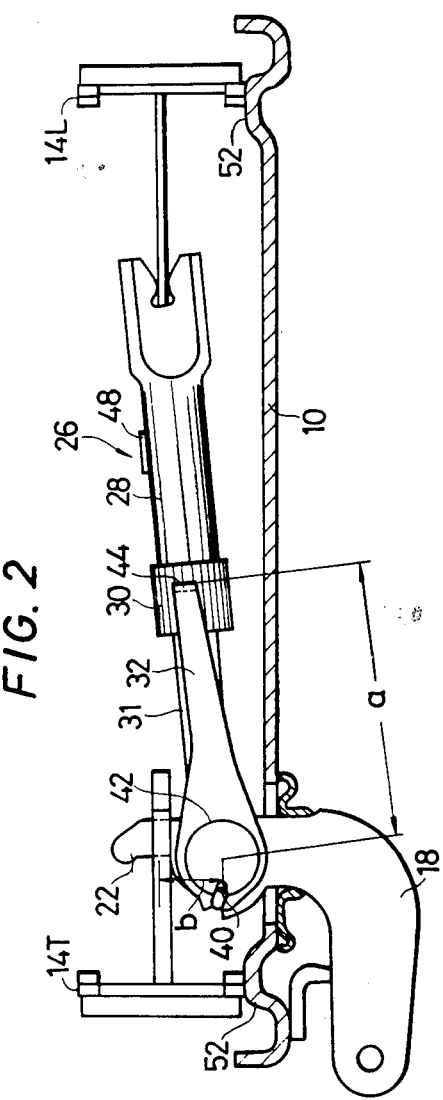
FIG. 2 is an enlarged, in scale, section on the line AA of FIG. 1.
Figure 3:
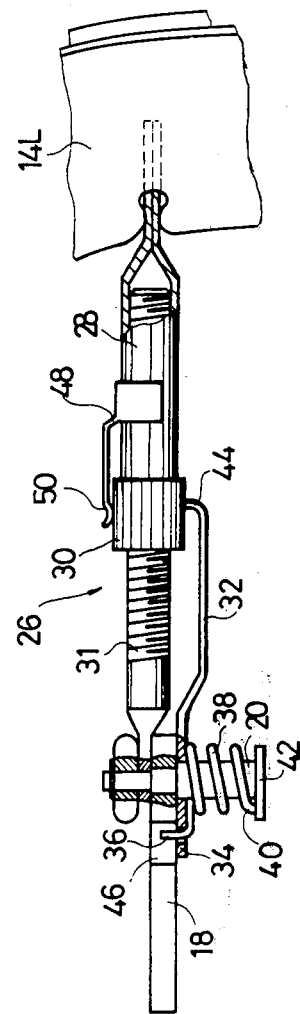
FIG. 3 is an enlarged fragmentary side view of FIG. 1 showing an arrangement to effect adjustment of shoe clearance.

The brake shown in FIGS. 1-3 of the drawings comprises a back plate 10 carrying a hydraulic actuator or slave cylinder 12 engaged by the adjacent tips of a pair of opposed arcuate brake shoes 14T and 14L urged inwardly towards each other by shoe return spring means 16. For service brake operation, the actuator 12 expands the shoes against the action of the return spring means in well known manner.

The auxiliary brake actuating mechanism comprises an actuating lever 18 securely mounted on a rotatable shaft 20 (see FIGS. 2 and 3) and having a finger 22 which engages in a shoe web window having a wear resistant slipper plate 24. The rotatable shaft 20 also extends through an eye at one end of a strut 26 comprising a tubular member 28, a ratchet wheel 30 formed on its outer periphery with ratchet teeth, and a screw-threaded spindle 31 in threaded engagement with the ratchet wheel 30. The outer end of the tubular member 28 is forked an engages in a notch in the adjacent shoe web.

For brake actuation through the above described mechanism, the lever 18 is rotated by a handbrake (or other mechanical auxiliary mechanism) in an anti-clockwise direction (as seen FIG. 2) with the shaft 20. The finger 22 presses the shoe 14T to the left, and the reaction is transferred by the shaft 20 to the strut 26 and so to the shoe 14L, to expand the shoes against the action of the return spring means 16. The shaft 20 thus acts as a second order lever in transmitting forces from the lever 18 to the strut 26.

The brake is provided with a slack adjuster. This device includes the strut 26 previously described, and operates to increase the effective length of the strut when wear compensating adjustment is required, by rotating the ratchet wheel 30 in response to excess movement of the shoes upon auxiliary brake actuation. This is effected by means of a pawl tooth 44 formed on one arm of a pivoted adjusting lever 32 rotatably mounted on the shaft 20. The other arm 34 (see FIG. 3) of the adjusting lever 32 has a slot (no numeral, see FIG. 3) to receive one end 36 of a torsion spring 38 which surrounds the shaft 20 and has its other end 40 anchored to a flange 42 projecting from the shaft 20. On assembly the spring 38 is prestressed so as to apply to the adjusting lever 32 a force tending to rotate it anti-clockwise (as seed in FIG. 2) so as to urge the pawl tooth 44 into engagement with the ratchet teeth on the ratchet wheel 30.

In the "brakes off" condition, this tendency is resisted by the engagement of the projecting end 36 of the spring 38 with a shoulder 46 on the actuating lever 18 (see FIG. 2).

However, when the handbrake is actuated, as described above, the lever 18, shaft 20 and pawl tooth 44 rotate together anti-clockwise (as seen in FIG. 2). If excess wear requires compensating adjustment, this is reflected in sufficient travel of the lever 18 and pawl tooth 44 to pick up a ratchet tooth and rotate the ratchet wheel 30 in a sense to increase the length of strut 26.

When the handbrake is released, the pair of shoes 14T and 14L are urged towards each other by the return spring means 16 to rotate the lever 18, shaft 20 and pawl 32 together clockwise (as seen in FIG. 2) through engagement of the finger 22 on the lever 18 in the shoe web window of the shoe 14T. Then the pawl tooth 44 on the pawl 32 tends to rotate the ratchet wheel 30 in a sense to decrease the length of strut 26. This tendency, however, is resisted by a stopper 48 mounted securely to the tubular body portion 28. The stopper 48 has a resilient finger 50 yieldably engaging in one of the teeth formed on the ratchet wheel 30.

As best seen in FIG. 3, the spring 38 is also prestressed in compression and acts on the adjusting lever 32 to hold it in yielding contact with the strut 26, i.e., to bias the pawl tooth 44 upwardly (as viewed in FIG. 3) against the ratchet teeth of the ratchet wheel 30.

Conditions for effecting adjustment by the slack adjuster as described above may be given as follows.

1. The pawl tooth 44 rotates the ratchet wheel 30 in an "adjust direction," i.e., in a sense to increase the length of the strut 26, when a resistance opposing rotation of the ratchet wheel in the "adjust direction" is not larger than an actuating force or load applied to the adjusting lever 32 by the torsion spring 38.

2. The pawl tooth 44 will leave the ratchet wheel 30 in an "adjusted position," i.e., a position of the ratchet wheel after adjustment, upon brake release by the auxiliary brake and will not rotate the ratchet wheel in a "reverse direction" from the "adjusted position" when a resistance opposing rotation of the wheel 30 in the "reverse direction" is not smaller than a force or load applied to the ratchet wheel 30 by the adjusting lever 32.

3. The adjusting lever 32 will reassume its "initial position," i.e., a relative position of the adjusting lever 32 to the actuating lever 18 as shown in FIG. 2, when a resistance opposing movement of the adjusting lever 32 towards the "initial position" is not larger than a force applied to the lever 32 in a sense to reverse it towards the "initial position."

The above described three conditions (1), (2) and (3) must be satisfied.

Figure 4:
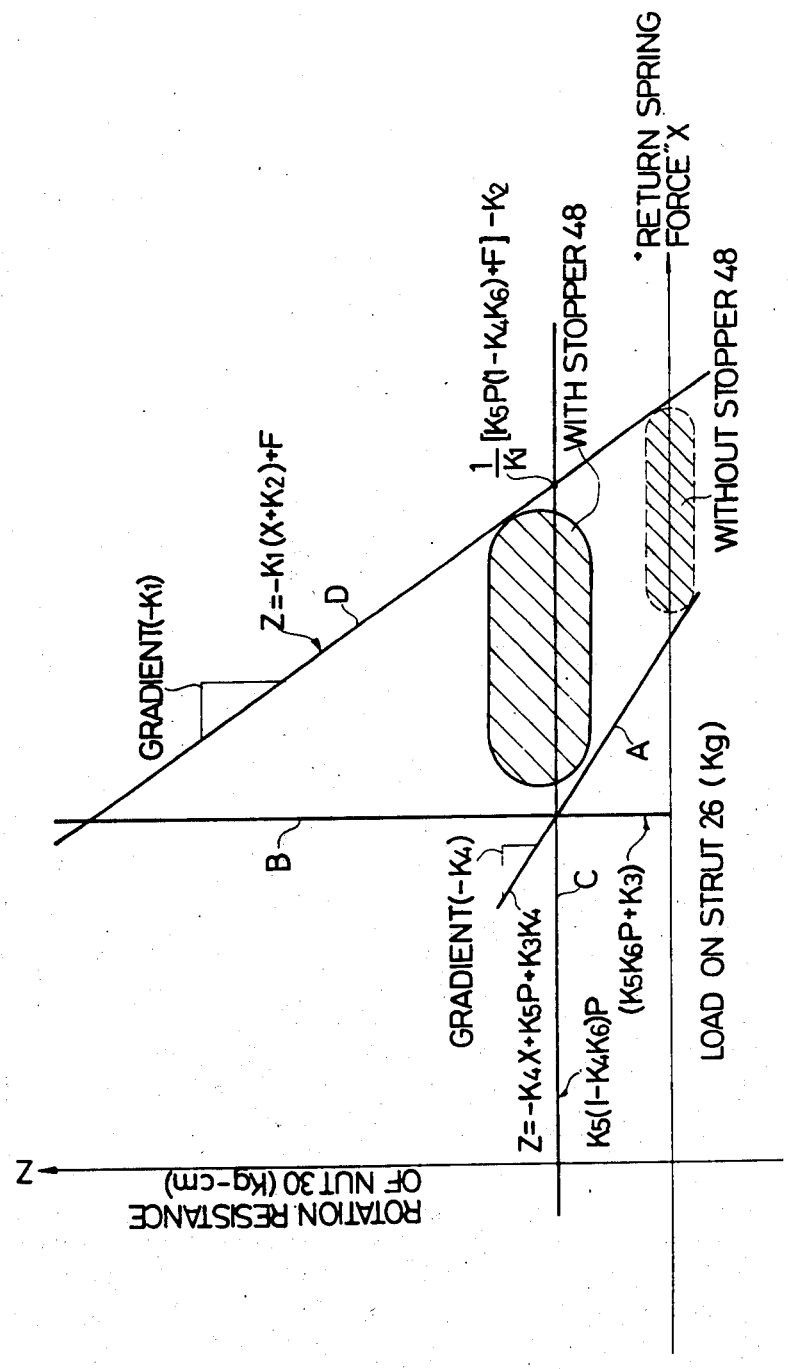
FIG. 4 is a graph used to determined preferred ranges of design parameters of the brake.

These conditions are graphically represented in FIG. 4. In FIG. 4, X denotes a "shoe return spring force," i.e., a load applied to the pair of shoes 14T and 14L and to the strut 26 by the return spring means 16, and Z denotes a force with which the finger 50 of the stopper 48 is held in yielding contact with the ratchet wheel 30.

The following three forces have to be set to satisfy relation falling in a fully drawn shaded zone in the case the stopper 48 is provided or in a hatched drawn shaded zone in the case the stopper 48 is not provided:

i. "Shoe return spring force" X.

ii. Force F with which the adjusting lever 32 is actuated by the torsion spring 38.

iii. Force P with which the adjusting lever 32 is held in yielding contact with the ratchet wheel 30 by the torsion spring 38.

By so setting, initial adjustment of shoe clearance will be effected by the auxiliary brake means only, while wear compensating adjustment will be effected by the auxiliary brake means with the help of the service brake.

The condition (1) may be represented as:

$$F > Y + Z$$

where Y is a resistance opposing rotation of the ratchet wheel 30 and caused by the "shoe return spring force" X.

Y may be given by:

$$Y = k_1(X + k_2)$$

where $k_2$: a resistance opposing expanding movement of the shoes 14T and 14L and caused by their sliding contact with wheel cylinders of the service brake 12 and with shoe ledges 52 (see FIG. 2).

$k_1$: $\mu A$, i.e., a coefficient of friction upon rotation of the ratchet wheel 30 in an "adjust direction."

Thus:

$$F > k_1(X + k_2) + Z$$

From this we obtain:

$$Z < -k_1(X + k_2) + F \quad (4)$$

The condition (2) may be represented as:

$$(X - k_3)k_4 + Z > k_5 P$$

where $k_3$: a resistance opposing contracting movement of the shoes 14T and 14L and caused by their sliding contact with wheel cylinders of the service brake 12 and with the shoe ledges 52.

$k_4$: $\mu R$, i.e., a coefficient of friction upon rotation of the ratchet wheel 30 in or opposite direction to the "adjust direction."

$k_5$: a coefficient representing the effect of the force P on a resistance opposing rotation of the ratchet wheel 30 in the opposite direction to the "adjust direction."

Thus:

$$X > \frac{k_5}{k_4} P - \frac{1}{k_4} Z + k_3$$

From this we obtain:

$$Z > -k_4 X + k_5 P + k_3 k_4 \quad (5)$$

The condition (3) may be represented as:

$$k_5 P \times k_6 < X - k_3$$

where $k_6$: a ratio of a distance (a) between the pawl tooth 44 and the axis of the shaft 20 to a distance (b) between engagement portion of the finger 22 with the shoe 14T and the axis of the shaft, i.e., $a/b$ (see FIG. 2).

Thus:

$$X > k_5 k_6 P + k_3 \quad (6)$$

Now it will be understood that the desired adjusting operation could be obtained if the yielding force Z with which the finger 50 of the stopper 48 is held in yielding contact with the ratchet wheel 30, and the "shoe return spring force" X are set to satisfy the mathematical representations (4), (5) and (6).

Preferably, the yielding force Z should be set at a value approximating a point at which a line A (which represents the mathematical representation (5) ) crosses a line B (which represents the mathematical representation (6) ) because a wide setting zone for the "shoe return spring foce" is given. The wide setting zone will permit a designer to set the "shoe return spring force" at a value with afford to take up manufacturing tolerances of the component parts, such as brake shoes and mutually contacting parts of auxiliary brake mechanism. Besides, the "shoe return spring force" can be set at a small value. Therefore, operating efficiency of the auxiliary and the service brakes will increase because loss in transmitting actuating force between the mutually contacting component parts is minimized.

Mathematically representing the value at which the line A crosses the line B:

$$Z = k_5(1 - k_4 k_6)P$$

Therefore, the preferred setting zone for X may be drawn as:

$$k_5 k_6 P + k_3 < X < 1/k_1 [k_5 P(1 - k_4 k_6) + F] - k_2$$

The advantages derived from the brake according to the present invention are as follows:

1. Since, initial shoe clearance adjustment upon assembly can be effected only by actuation of the auxiliary brake although wear compensating adjustment can be effected by actuation of the auxiliary brake upon brake application by the service brake, initial shoe clearance adjustment needed for brakes installed in automobiles upon line-off from an assembly line can be easily effected only by actuating the auxiliary brake, economizing steps required for such adjustment, thus improving the productivity.

2. Because the "shoe return spring force" of the return spring means can be made snall, it is easy to operate the service brake and auxiliary brake without any loss in transmitting of the actuating loads between component parts.

What is claimed is:

1. An internal shoe drum brake comprising:
   a pair of shoes;
   service brake means for expanding said brake shoes;
   shoe return spring means for retracting said shoes toward each other;
   an extensible strut extending between said shoes and including a ratchet wheel which may be rotated to extend said strut, an adjusting lever with a pawl tooth engageable with said ratchet wheel to rotate the same, stopper means held in yielding contact with said ratchet wheel, and an actuating lever with a finger engaging in one of said shoes;
   a shaft on which said actuating lever and said adjusting lever are mounted for rotation about the axis of said shaft, said shaft being coupled to said actuating lever for rotation therewith, the adjusting lever being rotatable relative to said shaft and said actuating lever, and
   a torsion spring prestressed to transmit forces from said shaft and said actuating lever to said adjusting lever to actuate the same, said torsion spring being also prestressed to hold said pawl in yielding contact with said ratchet wheel;
   in which said brake is so designed as to satisfy that:

$$X < \frac{1}{k_1}(Z + F) - k_2$$

$$X > \frac{k_5}{k_4} P - \frac{1}{k_4} Z + k_3$$

$$X > k_5 k_6 P + k_3$$

where
   X: a "shoe return spring force," i.e., a load applied to said pair of shoes and to said strut by said shoe return spring means,
   Z: a force with which said stopper means is held in yielding contact with said ratchet wheel,
   P: a force with which said adjusting lever is held in yielding contact with said ratchet wheel,
   F: a force with which said adjusting lever is actuated,
   $k_1$: a coefficient of friction upon rotation of said ratchet wheel in an "adjust direction," i.e., in a sense to increase the length of said strut,
   $k_2$: a resistance opposing expanding movement of said pair of shoes,
   $k_3$: a resistance opposing contracting movement of said pair of shoes, $k_4$: a coefficient of friction upon rotation of said ratchet wheel in a direction opposite to the "adjust direction", $k_5$: a coefficient representing the effect of the force P on a resistance opposing rotation of said ratchet wheel in the opposite direction to the "adjust direction", $k_6$: a ratio of a distance between said pawl tooth of said adjusting lever and the axis of said shaft to a distance between said finger of said actuating lever and the axis of said shaft.

2. An internal shoe drum brake as claimed in claim 1, in which the force Z is set in the neighbourhood of $k_5(1 - k_4k_6)P$.

3. An internal shoe drum brake as claimed in claim 2, in which the force X falls in a range defined as:

$$k_5k_6P + k_3 < X < 1/k_1 [k_5P(1 - k_4k_6) + F] - k_2.$$

* * * * *

UNITED STATES PATENT AND TRADEMARK OFFICE
CERTIFICATE OF CORRECTION

Page 1 of 2

PATENT NO. : 4,061,211
DATED : December 6, 1977
INVENTOR(S) : Kasuo Hoshimo and Masakazu Tanbara It is certified that error appears in the above-identified patent and that said Letters Patent are hereby corrected as shown below:

In the drawings, Sheet 3, Fig. 4, the formula $\frac{1}{K_1}[K_5P(1-K_4K_6)+F]-K_2$ should appear as follows:

$$\frac{1}{K_1}[F-K_5P(1-K_4K_6)]-K_2$$

In Column 6, lines 1-2, the formula $k_5k_6P + k_3 < X < 1/k_1[k_5P(1-k_4k_6)+F]-k_2$ should appear as follows:

$$k_5k_6P+k_3 < X < \frac{1}{k_1}[F-k_5P(1-k_4k_6)]-k_2$$

In Column 6, lines 45-47, the formula $X < \frac{1}{k_1}(Z+F)-k_2$ should appear as follows:

$$X < \frac{1}{k_1}(F-Z)-k_2$$

...Cont'd.

UNITED STATES PATENT AND TRADEMARK OFFICE
CERTIFICATE OF CORRECTION

PATENT NO. : 4,061,211
DATED : December 6, 1977
INVENTOR(S) : Kasuo Hoshimo and Masakazu Tanbara It is certified that error appears in the above-identified patent and that said Letters Patent are hereby corrected as shown below:

In Column 8, lines 8-9, the formula $$k_5 k_6 P + k_3 < X < 1/k_1 [k_5 P(1-k_4 k_6) + F] - k_2$$ should read as follows:

$$k_5 k_6 + k_3 < X < \frac{1}{k_1} [F - k_5 P(1-k_4 k_6)] - k_2$$

Signed and Sealed this

Twenty-second Day of August 1978

[SEAL]

Attest:

RUTH C. MASON
Attesting Officer

DONALD W. BANNER
Commissioner of Patents and Trademarks